(12) United States Patent
Kimura et al.

(10) Patent No.: US 11,273,691 B2
(45) Date of Patent: Mar. 15, 2022

(54) DOOR STRUCTURE OF VEHICLE

(71) Applicants: HI-LEX CORPORATION, Takarazuka (JP); TOYOTA JIDOSHA KABUSHIKI KAISHA, Toyota (JP)

(72) Inventors: Akitsugu Kimura, Takarazuka (JP); Masanori Tabayashi, Takarazuka (JP); Tetsuya Nagasaki, Toyota (JP)

(73) Assignees: HI-LEX CORPORATION, Takarazuka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/914,917

(22) Filed: Jun. 29, 2020

(65) Prior Publication Data

US 2020/0406726 A1 Dec. 31, 2020

(30) Foreign Application Priority Data

Jun. 28, 2019 (JP) .............................. JP2019-121350

(51) Int. Cl.
*B60J 5/04* (2006.01)
*B60J 1/00* (2006.01)
*B60J 1/17* (2006.01)
*B60J 10/76* (2016.01)

(52) U.S. Cl.
CPC ............. *B60J 5/0402* (2013.01); *B60J 1/004* (2013.01); *B60J 1/17* (2013.01); *B60J 5/0416* (2013.01); *B60J 5/0468* (2013.01); *B60J 10/76* (2016.02)

(58) Field of Classification Search
CPC . B60J 5/0402; B60J 1/004; B60J 1/005; B60J 1/17; B60J 5/0416; E05F 11/483

USPC ...................................................... 296/146.2
See application file for complete search history.

(56) References Cited

U.S. PATENT DOCUMENTS

| | | | |
|---|---|---|---|
| 5,005,316 A * | 4/1991 | Hornivius | ............ E05F 11/483 |
| | | | 49/348 |
| 5,018,305 A | 5/1991 | Kuki et al. | |
| 2017/0030123 A1* | 2/2017 | Costigan | ............... E05F 11/483 |
| 2020/0131834 A1* | 4/2020 | Yamamoto | .................. B60J 1/17 |
| 2021/0054672 A1* | 2/2021 | Tanaka | ........................ B60J 1/17 |

FOREIGN PATENT DOCUMENTS

| | | |
|---|---|---|
| EP | 0 389 869 A1 | 10/1990 |
| EP | 3007919 B1 | 9/2019 |
| JP | H02-129584 U | 10/1990 |

(Continued)

OTHER PUBLICATIONS

Nov. 12, 2020 Extended European Search Report issued in European Patent Application No. 20182408.3.

(Continued)

*Primary Examiner* — Jason S Morrow
(74) *Attorney, Agent, or Firm* — Oliff PLC (57) ABSTRACT

A door structure comprises a door body, a window glass having a substantially rectangular shape, and a window regulator. The door body has a sash being provided to the door body before the window glass is connected to the carrier plate at one side of the door body in a front and rear direction of the vehicle, and the sash has a groove, in which only one edge of the window glass is inserted, and the door structure further includes a separating member configured to separate the window glass from the sliding face of the guide rail.

5 Claims, 8 Drawing Sheets

(56) References Cited

FOREIGN PATENT DOCUMENTS

| | | | |
|---|---|---|---|
| JP | 2005-042472 A | 2/2005 | |
| JP | 2013-096209 A | 5/2013 | |
| JP | 2017-8544 A | 1/2017 | |
| JP | 2017-133228 A | 8/2017 | |
| JP | 2018071264 A * | 5/2018 | ................ B60J 1/17 |
| WO | 2008/112750 A1 | 9/2008 | |
| WO | 2014/191812 A1 | 12/2014 | |

OTHER PUBLICATIONS

May 11, 2021 Office Action issued in Japanese Patent Application No. 2019-121350.
Dec. 14, 2021 Office Action issued in Japanese Patent Application No. 2019-121350.

* cited by examiner

DOOR STRUCTURE OF VEHICLE

TECHNICAL FIELD

The present invention relates to a door structure of a vehicle.

BACKGROUND OF THE INVENTION

An opening/closing type window glass provided in a vehicle is mounted to a carrier plate of a window regulator to open/close the window glass after the window regulator is mounted to a door panel of the vehicle.

Regarding a window glass mounted to a carrier plate, the shape of a window glass to be moved by a window regulator may be substantially rectangular, such as a window provided in a rear side door of a side part of a vehicle (see JP 2013-096209 A). In such a case, a pair of sashes extends in substantially vertical direction and is provided apart from each other in the front and rear direction of the vehicle. Therefore, when the window glass is mounted to the window regulator, in a state where the pair of sashes is provided to the door of the vehicle, the range to adjust the position of the window glass in the front and rear direction of the vehicle is narrow, making it difficult to mount the window glass to the window regulator. Therefore, when the window glass is mounted to the window regulator, the window glass is fitted and guided only to the front sash without being fitted to the rear sash to move the window glass downward. Accordingly, the window glass may be mounted to the window regulator.

SUMMARY OF THE INVENTION

In this way, when a window glass is mounted, in a case that a sash is provided to a door of a vehicle only on one side of a body of the vehicle in the front and rear direction, the window glass is fitted only to the front sash and is moved downward. However, the window glass may be swing around the vertical axis with the sash as a fulcrum during the operation to move the window glass downward to mount the window glass to the window regulator. Here, when the window glass swings such that the window glass moves closer to a guide rail of the window regulator, the window glass may come into contact with the guide rail. Grease is applied onto the guide rail to increase the slidability of the carrier plate, causing the grease to be adhered onto the surface of the window glass due to contact of the window glass to the guide rail.

An object of the present invention is to provide a door structure of a vehicle, which makes it possible to suppress staining of a window glass with grease when the window glass is assembled into a window regulator.

A door structure of a vehicle according to the present invention comprises: a door body; a window glass having a substantially rectangular shape; and a window regulator being mounted to the door body and being connected to the window glass to lift and lower the window glass, wherein the window regulator has a guide rail and a carrier plate, the carrier plate supporting the window glass and moving along the guide rail to lift and lower the window glass, and wherein at least a portion of the carrier plate slides on a sliding face of the guide rail and grease is applied onto the sliding face of the guide rail, the door body has a sash, wherein the sash is configured to guide the window glass when the window glass is mounted, and the sash is provided to the door body before the window glass is connected to the carrier plate at one side of the door body in a front and rear direction of the vehicle, and the sash has a groove to guide the window glass in a lifting and lowering direction, and only one edge of front and rear edges of the window glass is inserted in the sash when the window glass is connected to the carrier plate, the door structure further comprising a separating member being configured to separate the window glass from the sliding face of the guide rail by inhibiting approaching of the window glass to the sliding face at an upper end part of the guide rail such that the window glass does not come into contact with the sliding face of the guide rail when the window glass swings with the one edge being guided to the sash as a fulcrum.

The door structure of the vehicle according to the present invention makes it possible to suppress staining of a window glass with grease when the window glass is assembled into a window regulator.

Moreover, in a method of assembling a door structure of a vehicle according to the present invention, the door structure of the vehicle comprising a door body; a window glass having a substantially rectangular shape; and a window regulator being mounted to the door body and being connected to the window glass to lift and lower the window glass, the window regulator has a guide rail and a carrier plate, the carrier plate supporting the window glass and moving along the guide rail to lift and lower the window glass, and wherein at least a portion of the carrier plate slides on a sliding face of the guide rail and grease is applied onto the sliding face of the guide rail, the door body has a sash, wherein the sash is configured to guide the window glass when the window glass is mounted, and the sash is provided to the door body before the window glass is connected to the carrier plate at one side of the door body in a front and rear direction of the vehicle, the sash has a groove to guide the window glass in a lifting and lowering direction, and only one edge of front and rear edges of the window glass is inserted in the sash when the window glass is connected to the carrier plate, and the method of assembling the door structure of the vehicle includes: mounting the window regulator to the door body; moving the window glass downward with only one edge of the front and rear edges of the window glass being guided to the sash; and connecting the window glass to the carrier plate, the door structure further comprises a separating member being configured to separate the window glass from the sliding face of the guide rail by inhibiting approaching of the window glass to the sliding face at an upper end part of the guide rail such that the window glass does not come into contact with the sliding face of the guide rail when the window glass swings with the one edge being guided to the sash as a fulcrum, and, in a step of moving the window glass downward, the window glass moves downward with the window glass being separated from the sliding face by the separating member. The method of assembling the door structure of the vehicle can be used in an assembly body of the door for the vehicle.

DETAILED DESCRIPTION

Below, with reference to the drawings, a door structure of a vehicle and a method of assembling a door structure of the vehicle according to an Embodiment of the present invention will be described. The Embodiment shown below is merely one example, so that the door structure of the vehicle and the method of assembling the door structure of the vehicle according to the present invention are not limited to the Embodiment shown below.

Figure 1:
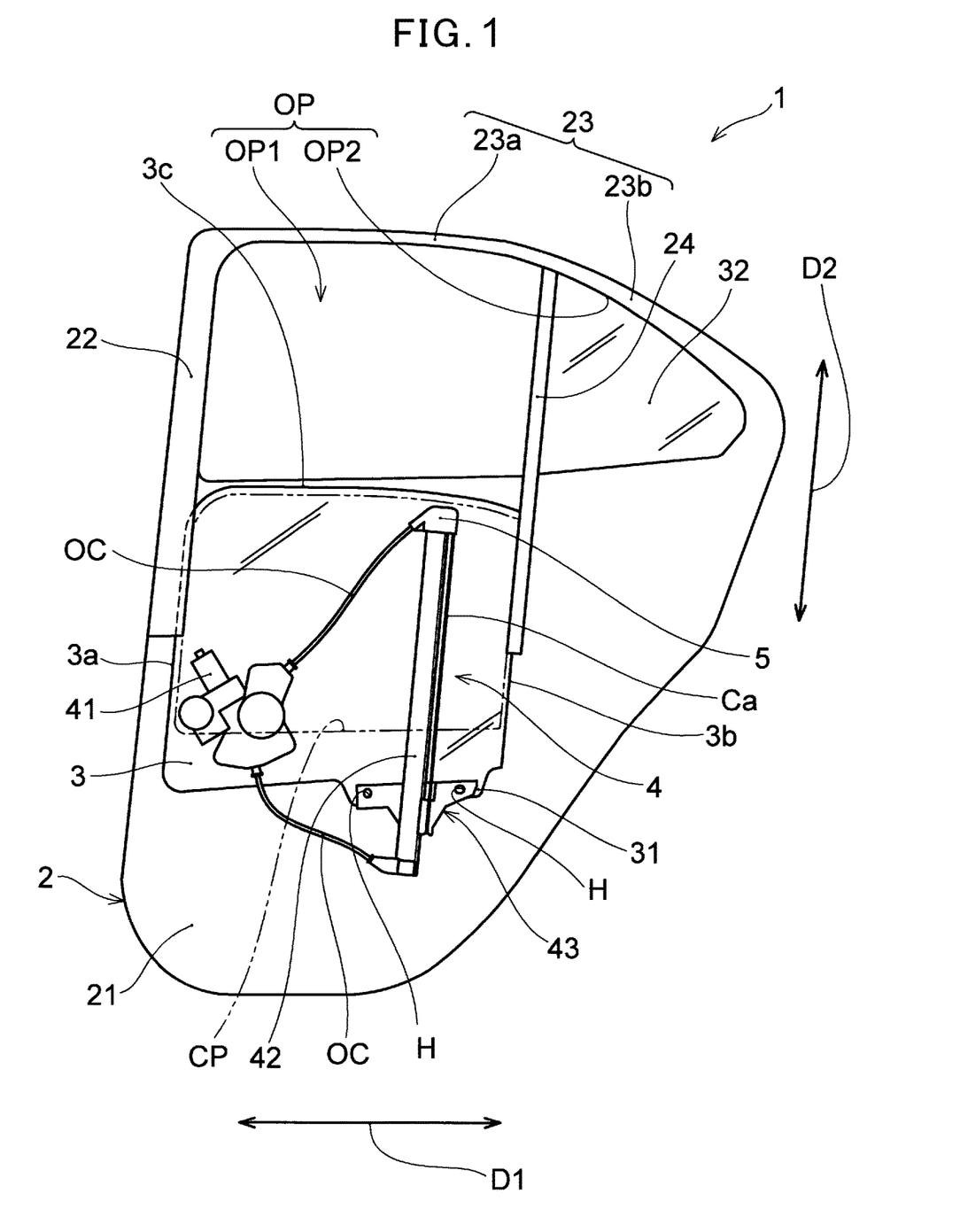
FIG. 1 schematically shows a door structure according to an Embodiment of the present invention with a window glass being assembled into the door structure.

As shown in FIG. 1, a door structure 1 of a vehicle according to the Embodiment comprises a door body 2, a window glass 3 having a substantially rectangular shape, and a window regulator 4 being mounted to the door body 2 and being connected to the window glass 3 to lift and lower the window glass 3.

The door body 2 is a door being mounted to the vehicle. While the door body 2 is a rear side door of the vehicle according to the Embodiment, it is not limited to the rear side door of the vehicle. According to the Embodiment, as shown in FIG. 1, the door body 2 has a door panel 21, a sash 22 being provided to the door body in advance before the window glass is connected to the carrier plate 43 at one side of the door body 2 in a front and rear direction D1 of the vehicle, and an upper sash 23 extending toward the other side of the door body 2 in a front and rear direction D1 of the vehicle from the upper end of the sash 22.

As shown in FIG. 1, the window regulator 4 is mounted to the door panel 21. According to the Embodiment, the door panel 21 has an outer panel 21a on the outside of the vehicle and an inner panel 21b on the vehicular compartment side (see FIG. 5). The window glass 3 moves in a space between the outer panel 21a and the inner panel 21b. While the material for the door panel 21 is not particularly limited, it may be any material having a given rigidity, such as a metal, for example. Moreover, the shape and structure of the door panel 21 is not particularly limited as long as the window regulator 4 can be mounted thereto and the door panel 21 has a space to lift and lower the window glass 3.

As shown in FIG. 1, the upper sash 23 is provided on the lifting direction side (upper side) with respect to the door panel 21 in lifting and lowering direction D2 of the window glass 3 and constitute a part of a door frame forming an opening OP to be opened and closed by the window glass 3. As described below, in the door structure 1 according to the Embodiment, a second sash 24 is mounted after the window glass 3 is mounted to the window regulator 4. Accordingly, the opening OP is separated into two opening parts. A first opening part OP1 of the opening OP between the sash 22 and the second sash 24 in the front and rear direction D1 of the vehicle is opened and closed by the window glass 3. Moreover, according to the Embodiment, a second opening part OP2, which is a part other than the first opening part OP1, of the opening part OP is closed by a fixed window 32.

The sash 22 guides the window glass 3 when the window glass 3 lifts and lowers. Moreover, according to the Embodiment, the sash 22 is configured to guide the window glass 3 when the window glass 3 is mounted to a carrier plate 43 of the window regulator 4. The sash 22 is provided to the door body 2 in advance before the window glass 3 is connected to the carrier plate 43 at one side of the door body 2 in the front and rear direction D1 of the vehicle. Specifically, the sash 22 extends along the lifting and lowering direction D2 of the window glass 3 (upward-downward direction of the vehicle) on the front side of the vehicle in the front and rear direction D1. As long as the sash 22 can guide the window glass 3 so as to lift and lower the window glass 3, the sash 22 may extend in the vertical direction, or may extend in the upward-downward direction of the vehicle such that the sash 22 is inclined with respect to the vertical direction.

The sash 22 has a groove 221 (see FIG. 4) to guide the window glass 3 in the lifting and lowering direction D2, and only one edge 3a of a front edge 3a and a rear edge 3b of the window glass 3 is inserted in the sash 22 when the window glass 3 is connected to the carrier plate 43. The groove 221 extends in the lifting and lowering direction D2 of the window glass 3 along the extending direction of the sash 22. The groove 221 is configured such that the one edge 3a of the window glass 3 can be inserted therein. According to the Embodiment, the groove 221 is formed in an elastically-deformable sealing member (a glass run) S being provided in the sash 22. According to the Embodiment, the window glass 3 is guided in the lifting and lowering direction D2 in a state in which the one edge 3a of the window glass 3 is sandwiched between an abutting piece Sa provided in the sealing member S and abutting on one face of the window glass 3 and an abutting piece Sb provided in the sealing member S and abutting on the other face of the window glass 3.

The upper sash 23 stops the window glass 3 at a given lifting position with an upper edge 3c of the window glass 3 being abutted against the upper sash 23. According to the Embodiment, the upper sash 23 extends toward the rear in the front and rear direction D1 of the vehicle from the upper end of the sash 22. The upper sash 23 has a lateral frame part 23a being arranged at a position against which the upper edge 3c of the window glass 3 abuts and an inclined frame part 23b being extended obliquely downward from the rear end part of the lateral frame part 23a in the front and rear direction D1 of the vehicle.

Moreover, in the Embodiment, as shown in FIG. 1, the door body 2 has the second sash 24 to be mounted to the door body 2 after the window glass 3 is connected to the carrier plate 43. The second sash 24 extends along the lifting and lowering direction D2 of the window glass 3. Along with the sash 22, the second sash 24 guides the window glass 3 in the lifting and lowering direction D2 when the window glass 3 is connected to the carrier plate 43 and driven for lifting and lowering by the window regulator 4. The second sash 24 is configured to guide the other edge (rear edge) 3b of the front and rear edges 3a and 3b of the window glass 3.

The second sash 24 is not mounted to the door body 2 (see FIGS. 7 and 8) before the window glass 3 is connected to the carrier plate 43. The second sash 24 is mounted to the door body 2 after the window glass 3 is connected to the carrier plate 43 (see FIG. 1). The second sash 24 is not provided to the door body 2 before the window glass 3 is connected to the carrier plate 43. Therefore, it is possible to easily mount the window glass 3 to the door body 2.

The second sash 24 is mounted to the door body 2 (the door panel 21 and the upper sash 23) such that the other edge (rear edge) 3b of the window glass 3 is inserted in the second sash 24 after the window glass 3 is connected to the carrier plate 43. The second sash 24 is arranged substantially parallel to the sash 22. The first opening part OP1 is defined by the sash 22, the second sash 24, the upper sash 23 (the lateral frame part 23a), and the upper edge of the door panel 21. The above-mentioned first opening part OP1 is opened and closed by the window 3 lifting and lowering. Moreover, the second opening part OP2 is defined by the second sash 24, the upper sash 23 (the inclined frame part 23b), and the upper edge of the door panel 21. The second opening part OP2 is closed by the fixing window 32. The shape and structure of the second sash 24 is not particularly limited as long as the second sash 24 can be mounted to the door body 2 after the window glass 3 is connected to the carrier plate 43, and the second sash 24 can guide the other edge 3b of the window glass 3. The second sash 24 may have a sealing member having a structure similar to or different from the sealing member (glass run) S being provided in the sash 22.

The window glass 3 is mounted to the carrier plate 43 of the window regulator 4 and is lifted and lowered by the window regulator 4 in the lifting and lowering direction D2. As shown in FIG. 1, the window glass 3 is formed in a substantially rectangular shape. The window glass 3 opens and closes the substantially rectangular-shaped first opening part OP1 by being lifted and lowered. In the Embodiment, a closing part CP (a double-dashed line in FIG. 1) of the window glass 3 to close the first opening part OP1 is shaped substantially rectangular unlike a shape in which one side of the vehicle in the front and rear direction D1 is tapered (like that of the window glass of the front door). The window glass 3 has a connecting part 31 to be connected to the carrier plate 43 at the lower part of the window glass 3. The window glass 3 is connected to the carrier plate 43 via the connecting part 31.

Figure 2:
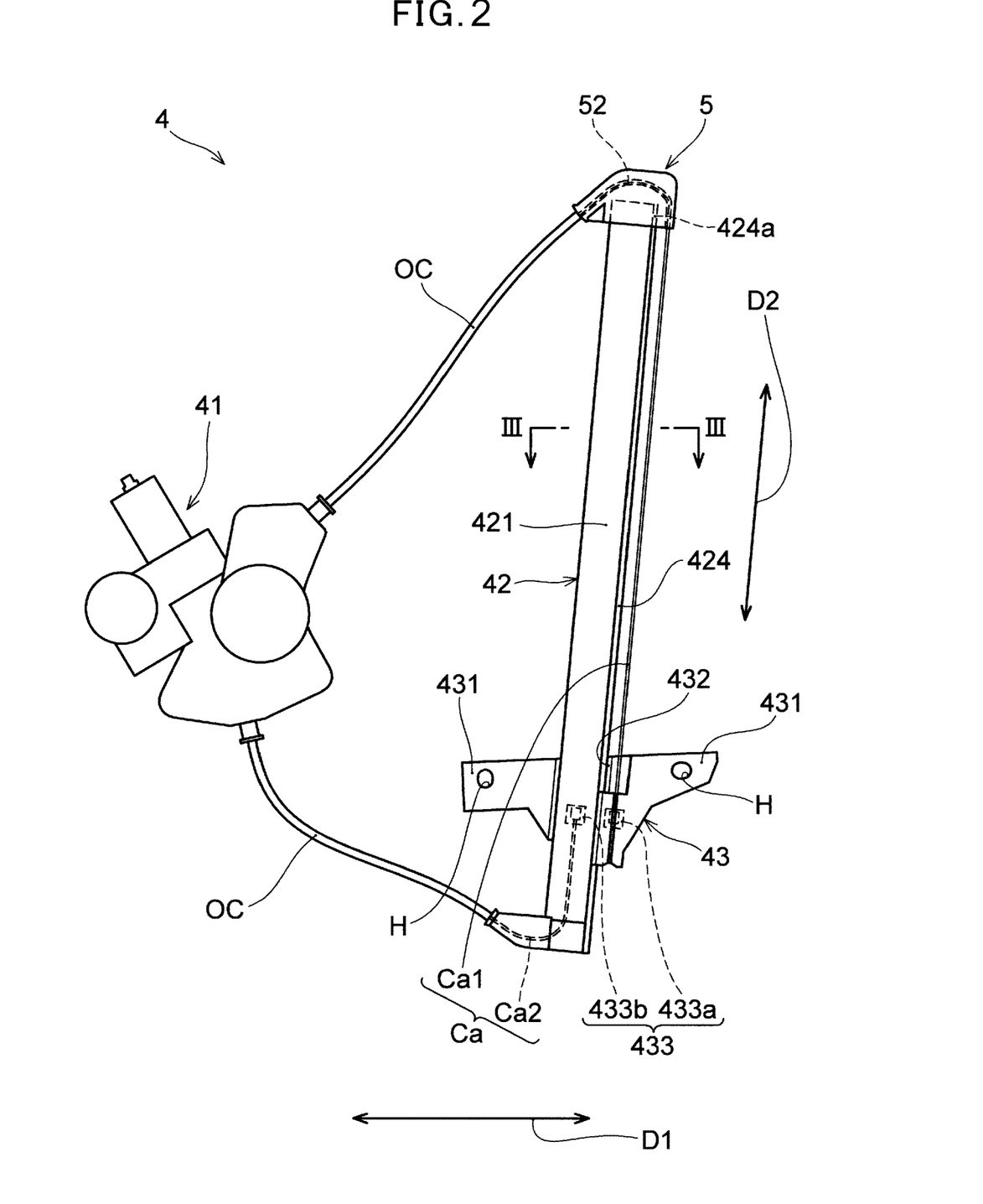
FIG. 2 schematically shows a window regulator being provided in the door structure in FIG. 1.

As shown in FIGS. 1 and 2, the window regulator 4 has a drive part 41, a guide rail 42, and the carrier plate 43 supporting the window glass 3 and moving along the guide rail 42 to lift and lower the window glass 3. According to the Embodiment, the window regulator 4 is shown as a cable-type window regulator to drive a cable Ca by the drive part 41 to thereby move the carrier plate 43 along the guide rail 42. However, the window regulator 4 is not limited to the cable-type window regulator as long as the window regulator 4 can move the carrier plate 43 along the guide rail 42.

The drive part 41 is a drive source to drive the cable Ca to move the carrier plate 43. In the Embodiment, the drive part 41 comprises a bidirectionally rotatable motor and drives the cable Ca to move the carrier plate 43 in the lifting and lowering direction D2. In the Embodiment, the drive part 41 is provided on the central side of the window regulator 4 in the lifting and lowering direction D2 of the window glass 3. However, the position at which the drive part 41 is provided is not limited to the position shown in a view. For example, the drive part 41 may be provided at the end part (on the lower end of the guide rail 42 in FIG. 1, for example) in the lifting and lowering direction D2 of the window regulator 4.

As shown in FIG. 2, the cable Ca has a lifting cable Ca1 and a lowering cable Ca2, the lifting cable Ca1 extending to the carrier plate 43 via the upper end of the guide rail 42 from the drive part 41, and the lowering cable Ca2 extending to the carrier plate 43 via the lower end of the guide rail 42 from the drive part 41. One end of the lifting cable Ca1 is connected to a drum of the drive part 41, and the other end of the lifting cable Ca1 is connected to the carrier plate 43. One end of the lowering cable Ca2 is connected to the drum of the drive part 41, and the other end of the lowering cable Ca2 is connected to the carrier plate 43. In the Embodiment, the cable Ca is being routed such that the cable Ca is housed in an outer casing OC from the guide rail 42 to the drive part 41.

The carrier plate 43 is mounted to the window glass 3. The carrier plate 43 lifts and lowers the window glass 3 by moving in the lifting and lowering direction D2 along the guide rail 42. As shown in FIG. 2, the carrier plate 43 has a window glass fixing part 431, with which the window glass 3 is fixed, a sliding part 432 to be slidably mounted to the guide rail 42, and a cable connecting part 433, to which the cable Ca is connected to operate the carrier plate 43.

As shown in FIGS. 1 and 2, the window glass fixing part 431 is provided at the end part on the lifting side of the carrier plate 43 in the lifting and lowering direction D2. The window glass fixing part 431 has a mounting hole H (see FIG. 2), in which a fixing member, such as a bolt, for mounting the window glass 3 to the carrier plate 43 is inserted. The window glass fixing part 431 is not limited to one having the mounting hole H, as long as the window glass fixing part 431 can mount the window glass 3 to the carrier plate 43. The window glass fixing part 431 may be indirectly mounted via a glass holder.

The sliding part 432 is a part to slide with respect to the guide rail 42 when the carrier plate 43 moves. The sliding part 432 is a part opposing the guide rail 42 to slide relative to the guide rail 42 when the carrier plate 43 moves in the lifting and lowering direction D2. The shape of the sliding part 432 can change appropriately in correspondence with the shape of the guide rail 42.

The end part of the cable Ca is connected to the cable connecting part 433. The shape and structure of the cable connecting part 433 are not particularly limited as long as the cable Ca can be connected to the cable connecting part 433 such as to allow the carrier plate 43 to lift and lower. In the Embodiment, the carrier plate 43 has a first cable connecting part 433a to which the lifting cable Ca1 is connected, and a second cable connecting part 433b to which the lowering cable Ca2 is connected.

The shape and structure of the carrier plate 43 is not particularly limited as long as the window glass 3 can be mounted to the carrier plate 43 and the carrier plate 43 can move in the lifting and lowering direction D2 along the guide rail 42.

Figure 5:
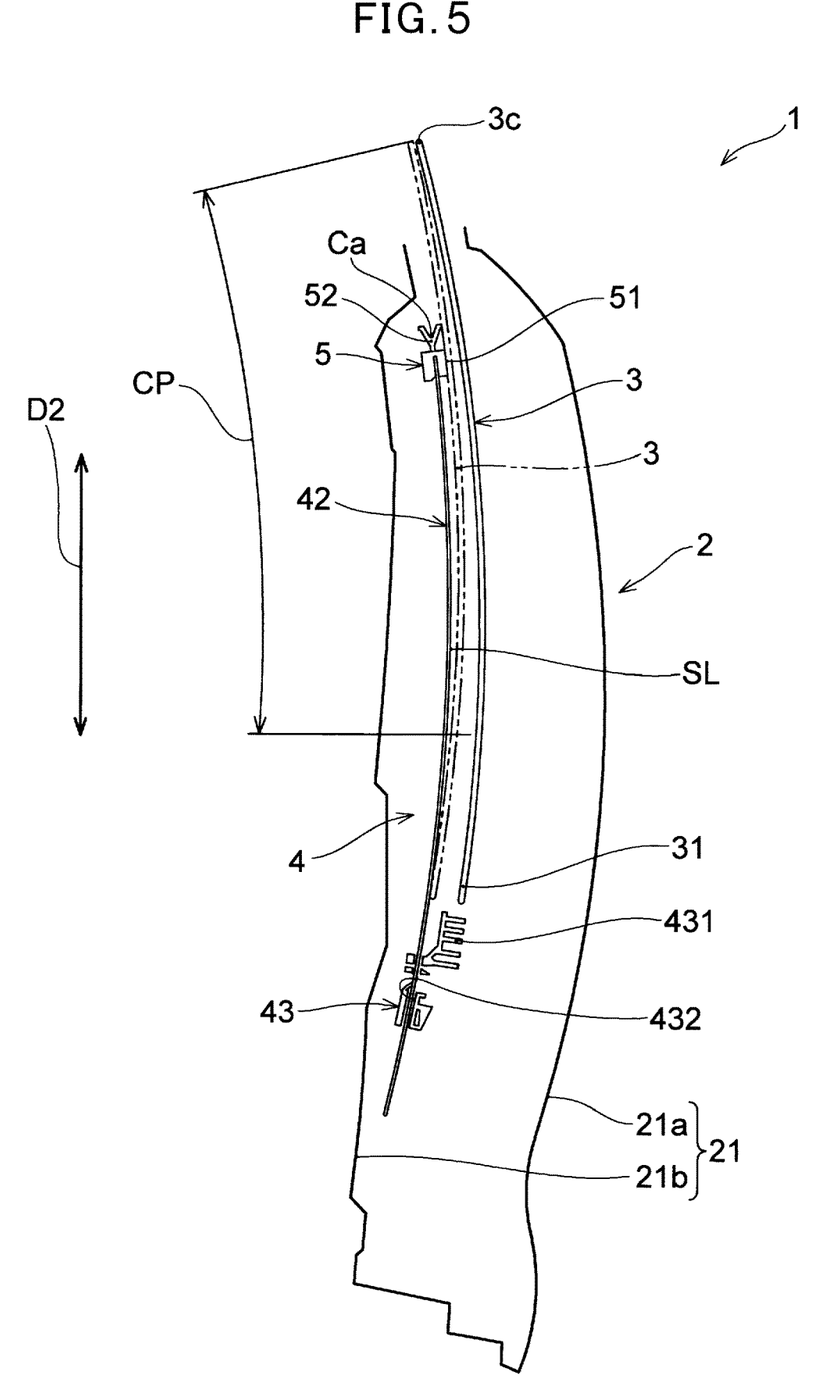
FIG. 5 shows a view along a line V-V in FIG. 8 with the window glass being separated from a sliding face.

The guide rail 42 guides the carrier plate 43 such that the carrier plate 43 slides along a given movement path. In the Embodiment, the guide rail 42 has a given length along the movement path of the carrier plate 43. As shown in FIG. 5, the guide rail 42 is curved in a bow shape along the length direction of the guide rail 42. In the Embodiment, as shown in FIG. 5, the guide rail 42 and the window glass 3 are curved with substantially the same curvatures. The material of the guide rail 42 may be made to be a metal or a hard resin, for example. However, it is not particularly limited thereto as long as it is a material having a given rigidity with which the carrier plate 43 can be guided.

The guide rail 42 is configured to oppose the carrier plate 43 in the thickness direction (the depth direction of the paper sheet in FIG. 1) of the window glass 3 such that the carrier plate 43 can slide relative to the guide rail 42. Grease G is applied onto a sliding face SL (see FIG. 3) on which at least a portion of the carrier plate 43 slides, of the guide rail 42. The grease G is applied onto a portion of the guide rail 42 to improve the slidability with respect to the guide rail 42 of the carrier plate 43. The sliding face SL is a face of the guide rail 42 opposing the carrier plate 43 in the thickness direction of the guide rail 42, which is the same direction as the thickness direction of the window glass 3.

Figure 3:
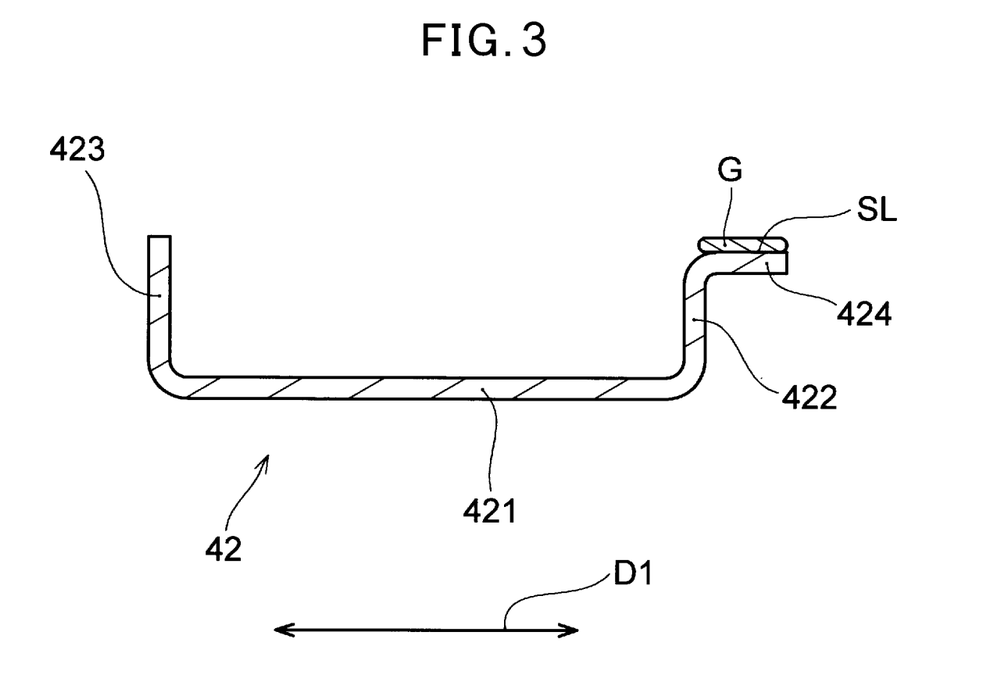
FIG. 3 shows a cross-sectional view along a line III-III in FIG. 2.

The shape of the guide rail 42 is not particularly limited as long as the guide rail 42 can guide the carrier plate 43 along a given movement path. In the Embodiment, as shown in FIGS. 2 and 3, the guide rail 42 has a base part 421 opposing the window glass 3 and extending in the lifting and lowering direction D2, a first ridge part 422 projecting from one side edge of the base part 421 toward the window glass 3, a second ridge part 423 projecting from the other side edge of the base part 421 toward the window glass 3, and an extending part 424 extending from a tip of the first ridge part 422 in a direction being away from the second ridge part 423. In the Embodiment, the first ridge part 422 is provided at a position being away from the sash 22 in the front and rear direction D1 of the vehicle, relative to the second ridge part 423. Moreover, in the Embodiment, the extending part 424 extends from the tip of the first ridge part 422 in a direction being away from the sash 22 and is formed in a plate shape being elongated in the lifting and lowering direction D2.

In the Embodiment, the extending part 424 has the sliding face SL, and the grease G is applied onto the sliding face SL of the extending part 424. The expression "the grease G is applied onto the sliding face SL" in the specification means it suffices that the grease G be applied onto at least a portion of the sliding face SL, so that the grease G does not necessarily have to be applied onto the entire surface of the sliding face SL. Moreover, faces opposing the carrier plate 43, for example, of the base part 421, the second ridge part 423, and the first ridge part 422 other than the extending part 424 may also be sliding faces, so that the grease G may be applied to these sliding faces. The grease G may be applied onto the guide rail 42 along the length direction of the guide rail 42.

Figure 4:
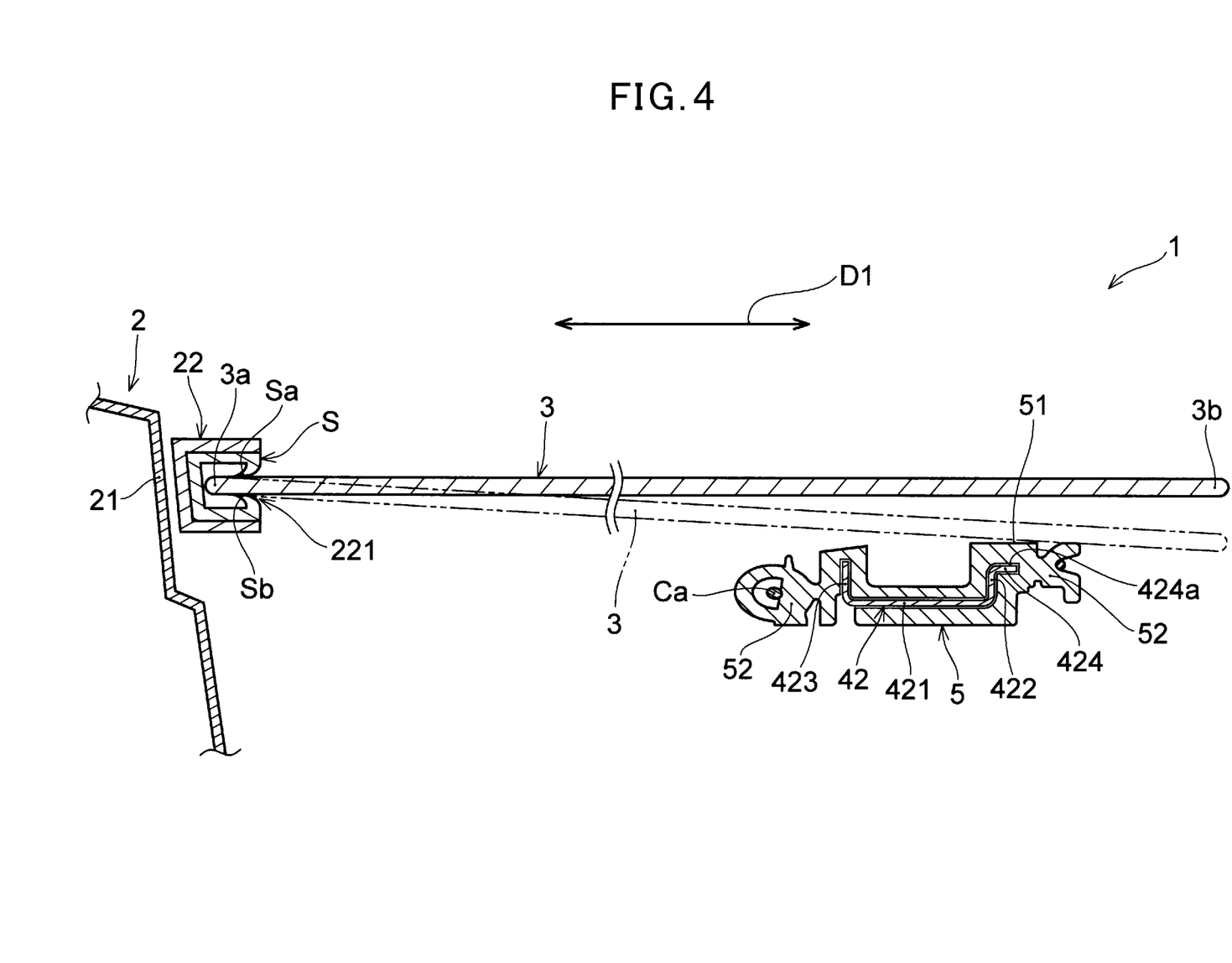
FIG. 4 shows a view along a line IV-IV in FIG. 7 and shows swinging of the window glass being guided to a sash.

In the Embodiment, as shown in FIGS. 4 and 5, the door structure 1 has a separating member 5 being configured to separate the window glass 3 from the sliding face SL of the guide rail 42 by inhibiting approaching of the window glass 3 to the sliding face SL at the upper end part of the guide rail 42 such that the window glass 3 does not come into contact with the sliding face SL of the guide rail 42 when the window glass 3 swings with the one edge (front edge) 3a being guided to the sash 22 as a fulcrum.

The separating member 5 separates the window glass 3 from the sliding face SL onto which the grease G is applied when the window glass 3 moves downward toward the carrier plate 43. This makes it possible to suppress adhering of the grease G onto the closing part CP of the window glass 3 even when the window glass 3 swings with the edge 3a as a fulcrum and suppress staining of the window glass 3 with the grease G when the window glass 3 is assembled into the window regulator 4.

Specifically, as shown in FIG. 4, when the window glass 3 is connected to the carrier plate 43, only the one edge 3a of the front and rear edges 3a and 3b of the window glass 3 is guided to the sash 22, while the other edge 3b is not guided. Therefore, the window glass 3 may swing with the edge 3a being guided into the groove 221 of the sash 22 as a fulcrum during the movement operation to move the window glass 3 to the carrier plate 43 (see two-dot chain line). In this case, as shown in FIG. 5, at the upper end part of the guide rail 42, the separating member 5 abuts against the window glass 3 to cause approaching of the window glass 3 to the guide rail 42 to be inhibited. In this way, at the upper end part of the guide rail 42, approaching of the window glass 3 to the guide rail 42 being inhibited, a part of the window glass 3, which is opposed to the guide rail 42 and is positioned lower than an abutting part being in contact with the separating member 5 of the window glass 3 can be separated from the sliding face SL of the guide rail 42 as shown in FIG. 5. Therefore, adhering of the grease G onto the window glass 3, in particular onto the closing part CP of the window glass 3, is suppressed. In the Embodiment, while the lower edge of the window glass 3 is in contact with the sliding face SL, the lower edge of the window glass 3 is never exposed to the outside when the window glass 3 is closed, unlike the closing part CP. Therefore, it suffices that the grease G be not adhered onto the closing part CP being exposed to the outside and the surrounding of the closing part CP when the window glass 3 is closed.

In the Embodiment, as shown in FIGS. 1, 2, and 5, the separating member 5 is a guide member being provided at the upper end part of the guide rail 42 to change the direction of the cable Ca at the upper end part of the guide rail 42. However, the separating member 5 does not have to be a guide part as long as the separating member 5 is configured to inhibit approaching of the window glass 3 at the upper end part of the guide rail 42 and separate the window glass 3 from the sliding face SL.

Moreover, in the Embodiment, the separating member 5 has a thickness so that the separating member 5 is configured to support the window glass 3 such that the window glass 3 is separated from the sliding face SL by the sash 22 and the separating member 5 when the window glass 3 is housed in the door body 2. Specifically, as shown in FIG. 5, when the window glass 3 is housed in the door body 2 (in the door panel 21), the closing part CP of the window glass 3 is separated from the sliding face SL to cause adhering of the grease G to be suppressed. The thickness of the separating member 5 is the length in a direction being parallel to the thickness direction of the window glass 3. The thickness of the separating member 5 is set to be a thickness such that the window glass 3 does not come into contact with the sliding face SL when the window glass 3 swings with the edge 3a of the window glass 3 as a fulcrum, or movement (rattling) in the thickness direction of the window glass 3 in the groove 221 of the sash 22. The separating member 5 having a given thickness as mentioned above restricts swinging, which is not controllable only by the sash 22, with the edge 3a of the window glass 3 as a fulcrum to a predetermined range, to control the movement track of the window glass 3 and suppress contacting of the window glass 3 to the sliding face SL.

In the Embodiment, the separating member 5 is provided on the extension line of the sliding face SL in the lifting and lowering direction D2. The separating member 5 being provided on the extension line of the sliding face SL in the lifting and lowering direction D2 (above the sliding face SL in the lifting and lowering direction D2) makes it easy to suppress contacting of the sliding face SL and the window glass 3.

Moreover, in the Embodiment, the separating member 5 has a given width in the front and rear direction D1 of the vehicle and has a given height in the lifting and lowering direction D2. The separating member 5 having the given width makes it possible to increase the strength of the separating member 5 and makes it possible to hold the window glass 3 at a given position so as not to further approach toward the sliding face SL when the window glass 3 is contacted with the separating member 5. The width and height of the separating member 5 are not particularly limited as long as the separating member 5 can separate the window glass 3 from the sliding face SL of the guide rail 42 to suppress adhering of the grease G onto the closing part CP of the window glass 3. In the Embodiment, the width of the separating member 5 is greater than that of the extending part 424, allowing further suppressing of adhering of the grease G.

The shape of the separating member 5 is not particularly limited as long as the separating member 5 can separate the window glass 3 from the sliding face SL of the guide rail 42 to suppress adhering of the grease G onto the closing part CP of the window glass 3. In the Embodiment, as shown in FIG. 4, the separating member 5 is a guide member, and has an abutting part 51 abutting against the window glass 3 when the window glass 3 swings and being provided so as to oppose the part 424a on the extension line of the sliding face SL in the lifting and lowering direction D2, and a cable guiding part 52 to guide the cable Ca. The abutting part 51 is provided so as to oppose the part 424a (see FIG. 4) on the extension line of the sliding face SL in the lifting and lowering direction D2. The cable guiding part 52 guides the cable Ca such that the cable Ca to be guided passes rearward of a rear edge of the guide rail 42 (at a side of the extending part 424) in the front and rear direction D1 of the vehicle, passes over the upper end of the guide rail 42 and passes frontward of a front edge of the guide rail 42 (at a side of the second ridge part 423). While the material of the separating member 5 is not particularly limited, the material of the separating member 5 is preferably a resin material that hardly damages the window glass 3 in a case that the separating member 5 abuts against the window glass 3.

Next, using the door structure according to the Embodiment as an example, a method of assembling the door structure will be described.

Figure 6:
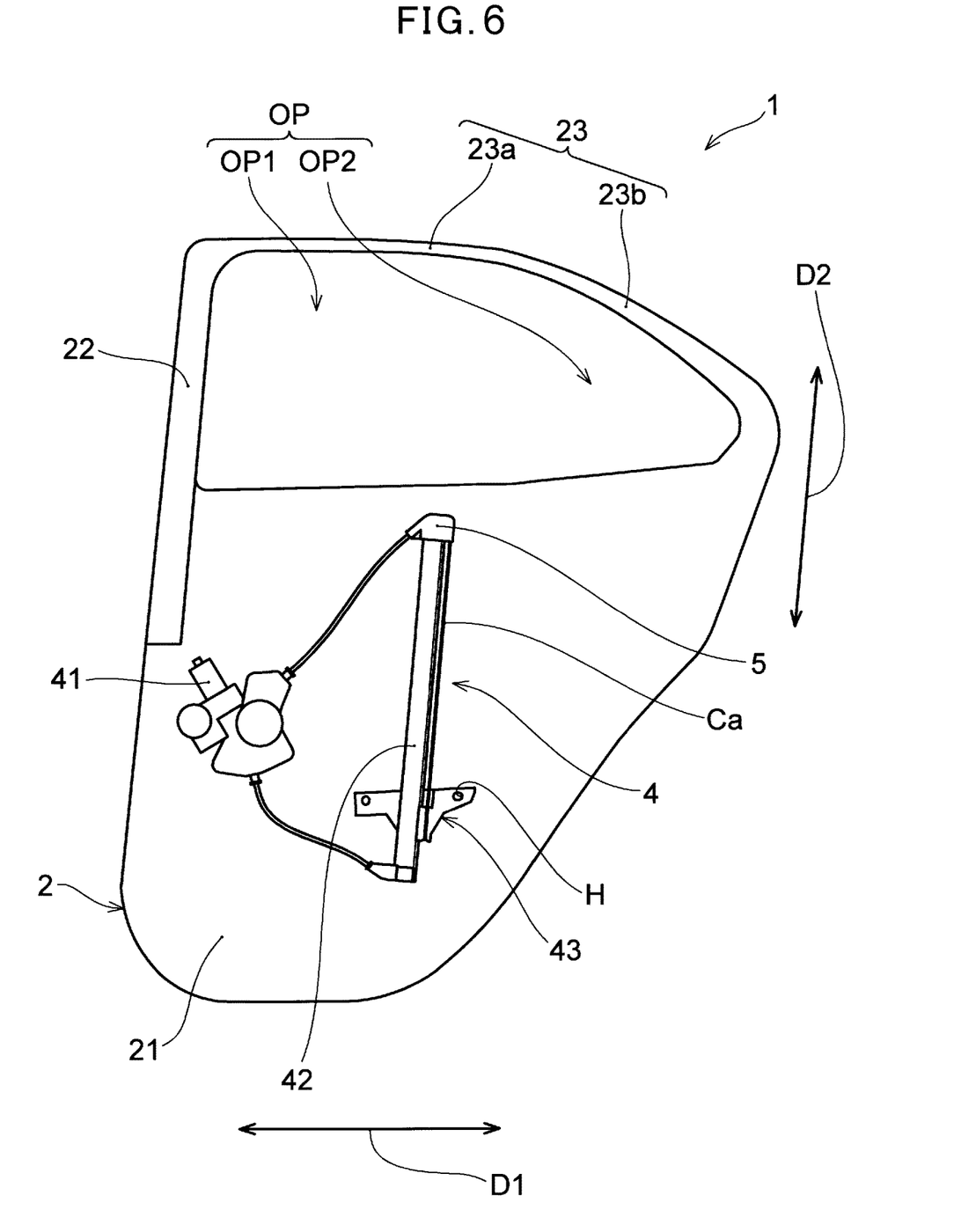
FIG. 6 schematically shows the state which the window regulator is mounted to a door body.

First, as shown in FIG. 6, the window regulator 4 is mounted to the door body 2. Here, the carrier plate 43 of the window regulator 4 is positioned on the lower end side of the guide rail 42. In a case that the window glass 3 is mounted to the carrier plate 43 with the carrier plate 43 being arranged on the lower end side of the guide rail 42, the carrier plate 43 stabilizes at the lower end, so that the window glass 3 is easily mounted thereto. In such a state, the second sash 24 is not mounted to the door body 2, so that the first opening part OP1 and the second opening part OP2 are being opened. The separating member 5 is provided at the upper end part of the guide rail 42 extending along the lifting and lowering direction D2.

Figure 7:
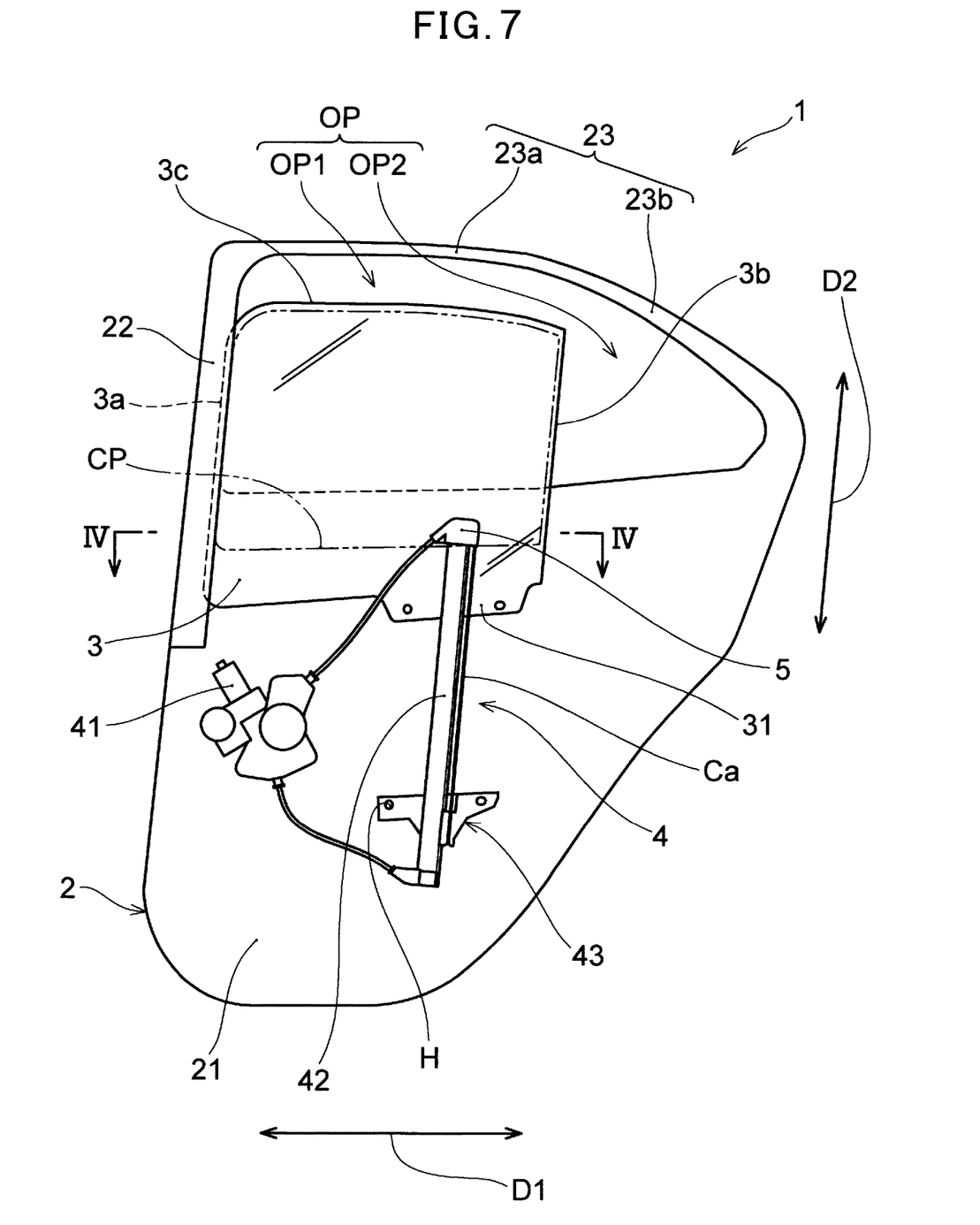
FIG. 7 schematically shows the state which the window glass is inserted to the sash of the door body from the state shown in FIG. 6.
Figure 8:
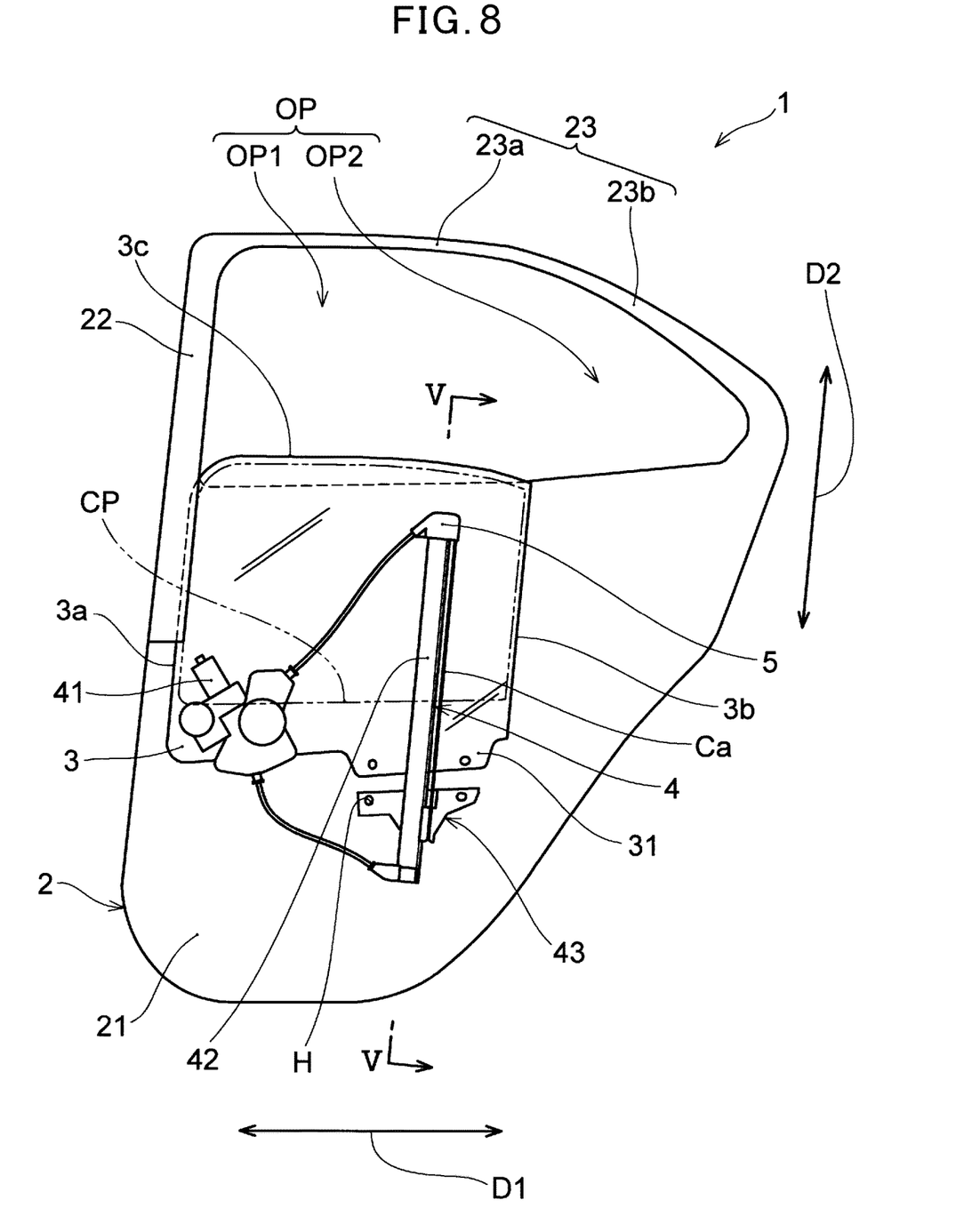
FIG. 8 schematically shows the state in which the window glass moves downward from the state shown in FIG. 7 before the window glass is mounted to a carrier plate of the window regulator.

Next, as shown in FIGS. 7 and 8, the window glass 3 is moved downward with only the one edge 3a of the front and rear edges 3a and 3b of the window glass 3 being guided to the sash 22. Specifically, the window glass 3 is inserted to the groove 221 of the sash 22 from the first opening part OP1 and the second opening part OP2 being opened and the window glass 3 is inserted into the door panel 21 of the door body 2 (for convenience of explanations, illustration of the inner panel 21b is omitted in FIGS. 1 and 6-8.). When the edge 3a of the window glass 3 is inserted in the sash 22, the edge 3a of the window glass 3 is guided to the sash 22 to move the window glass 3 downward in the lifting and lowering direction D2.

While swinging of the window glass 3 at a side of the edge 3a is regulated by the sash 22, the window glass 3 at a side of the edge 3b may swing with the edge 3a being guided to the sash 22 as a fulcrum as shown in FIG. 4. Even when the window glass 3 swings, the window glass 3 moves downward with the window glass 3 being separated from the sliding face SL by the separating member 5. Specifically, as shown in FIGS. 4 and 5, the window glass 3 abutting against the separating member 5 causes the closing part CP of the window glass 3 to be separated at a given distance from the sliding face SL, allowing adhering of the grease G, which is applied onto the sliding face SL, onto the closing part CP of the window glass 3 to be suppressed.

From the state shown in FIG. 8, the window glass 3 is moved further downward to connect the window glass 3 to the carrier plate 43 (see FIG. 1). This completes assembling of the window glass 3 into the window regulator 4. When the window glass 3 is assembled into the window regulator 4, the second sash 24 is mounted to the door body 2 as shown in FIG. 1. In this way, the window glass 3 is guided not only to the one edge 3a of the window glass 3, but also to the other edge 3b thereof, allowing the lifting and lowering operation of the window glass 3 to be stabilized.

As described above, adhering of grease G onto a closing part CP of a window glass 3 is suppressed. Therefore, the grease G is not adhered onto the closing part CP of the window glass 3 when the window glass 3 is lifted after the window glass 3 is assembled and the second sash 24 is mounted. Therefore, the need for cleaning operations to remove the grease G from the window glass 3 is eliminated, thereby improving the workability.

1 Door structure
2 Door body
21 Door panel
21a Outer panel
21b Inner panel
22 Sash
221 Groove
23 Upper sash
23a Lateral frame part
23b Inclined frame part
24 Second sash
3 Window glass
3a One edge
3b The other edge
3c Upper edge of window glass
31 Connecting part
32 Fixed window
4 Window regulator
41 Drive part
42 Guide rail
421 Base part
422 First ridge part
423 Second ridge part
424 Extending part
424a Part on extension line of sliding face in lifting and lowering direction
43 Carrier plate
431 Window glass fixing part
432 Sliding part
433 Cable connecting part
433a First cable connecting part
433b Second cable connecting part
5 Separating member
51 Abutting part
52 Cable guiding part
Ca Cable
Ca1 Lifting Cable
Ca2 Lowering Cable
CP Closing part
D1 Front and rear direction of vehicle
D2 Lifting and lowering direction of window glass
G Grease
H Mounting hole OC Outer casing
OP Opening
OP1 First opening part
OP2 Second opening part
S Sealing member (glass run)
Sa, Sb Abutting piece
SL Sliding face

What is claimed is:

1. A door structure of a vehicle, the door structure comprising: a door body; a window glass having a substantially rectangular shape; and a window regulator being mounted to the door body and being connected to the window glass to lift and lower the window glass, wherein the window regulator has a guide rail and a carrier plate, the carrier plate supporting the window glass and moving along the guide rail to lift and lower the window glass, and wherein at least a portion of the carrier plate slides on a sliding face of the guide rail and grease is applied onto the sliding face of the guide rail, the door body has a sash, wherein the sash is configured to guide the window glass when the window glass is mounted, and the sash is provided to the door body before the window glass is connected to the carrier plate at one side of the door body in a front and rear direction of the vehicle, and the sash has a groove to guide the window glass in a lifting and lowering direction, and only one edge of front and rear edges of the window glass is inserted in the sash when the window glass is connected to the carrier plate, the door structure further comprising a separating member being configured to separate the window glass from the sliding face of the guide rail by inhibiting approaching of the window glass to the sliding face at an upper end part of the guide rail such that the window glass does not come into contact with the sliding face of the guide rail when the window glass at a side of an other edge of the front and rear edges of the window glass swings with the one edge being guided to the sash as a fulcrum.

2. The door structure of the vehicle according to claim 1, wherein the separating member has a thickness so that the separating member is configured to support the window glass such that the window glass is separated from the sliding face by the sash and the separating member when the window glass is housed in the door body.

3. The door structure of the vehicle according to claim 1, wherein the guide rail comprises a base part opposing the window glass and extending in the lifting and lowering direction, a first ridge part projecting from one side edge of the base part toward the window glass, a second ridge part projecting from the other side edge of the base part toward the window glass, and an extending part extending from a tip of the first ridge part in a direction being away from the second ridge part, and the extending part has the sliding face.

4. The door structure of the vehicle according to claim 1, wherein the door body has a second sash to be mounted to the door body after the window glass is connected to the carrier plate, the second sash extending along the lifting and lowering direction of the window glass, and the second sash is configured to guide the other edge of the front and rear edges of the window glass.

5. A method of assembling a door structure of a vehicle, the door structure comprising: a door body; a window glass having a substantially rectangular shape; and a window regulator being mounted to the door body and being connected to the window glass to lift and lower the window glass, wherein the window regulator has a guide rail and a carrier plate, the carrier plate supporting the window glass and moving along the guide rail to lift and lower the window glass, and wherein at least a portion of the carrier plate slides on a sliding face of the guide rail and grease is applied onto the sliding face of the guide rail, the door body has a sash, wherein the sash is configured to guide the window glass when the window glass is mounted, and the sash is provided to the door body before the window glass is connected to the carrier plate at one side of the door body in a front and rear direction of the vehicle, and the sash has a groove to guide the window glass in a lifting and lowering direction, and only one edge of front and rear edges of the window glass is inserted in the sash when the window glass is connected to the carrier plate, the method of assembling the door structure of the vehicle comprising:

mounting the window regulator to the door body;

moving the window glass downward with only the one edge of the front and rear edges of the window glass being guided to the sash; and connecting the window glass to the carrier plate, the door structure further comprising:

a separating member being configured to separate the window glass from the sliding face of the guide rail by inhibiting approaching of the window glass to the sliding face at an upper end part of the guide rail such that the window glass does not come into contact with the sliding face of the guide rail when the window glass at a side of an other edge of the front and rear edges of the window glass swings with the one edge being guided to the sash as a fulcrum, and, in a step of moving the window glass downward, the window glass moves downward with the window glass being separated from the sliding face by the separating member.

* * * * *